United States Patent
Ngo et al.

(10) Patent No.: US 8,165,050 B2
(45) Date of Patent: Apr. 24, 2012

(54) SYSTEM AND METHOD FOR USE OF A SHORT BEACON IN A WIRELESS COMMUNICATION NETWORK

(75) Inventors: Chiu Ngo, San Francisco, CA (US); Huai-Rong Shao, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 488 days.

(21) Appl. No.: 12/410,091

(22) Filed: Mar. 24, 2009

(65) Prior Publication Data

US 2010/0002627 A1 Jan. 7, 2010

Related U.S. Application Data (60) Provisional application No. 61/077,582, filed on Jul. 2, 2008.

(51) Int. Cl.
*G08C 17/00* (2006.01)
(52) U.S. Cl. ......... 370/311; 370/318; 370/328; 370/338
(58) Field of Classification Search ................ None
See application file for complete search history.

(56) References Cited

U.S. PATENT DOCUMENTS

| | | | | |
|---|---|---|---|---|
| 6,393,303 | B1 | 5/2002 | Katz | 455/562.1 |
| 7,529,222 | B2 | 5/2009 | Kim et al. | 370/348 |
| 2003/0128690 | A1* | 7/2003 | Elliott et al. | 370/351 |
| 2006/0040675 | A1 | 2/2006 | Halfmann et al. | 455/456.1 |
| 2006/0077041 | A1* | 4/2006 | Chan et al. | 340/10.4 |
| 2007/0013419 | A1* | 1/2007 | Ayyagari et al. | 327/156 |
| 2008/0137684 | A1* | 6/2008 | Huang et al. | 370/447 |
| 2009/0054054 | A1 | 2/2009 | Shao et al. | 455/422.1 |
| 2009/0143018 | A1* | 6/2009 | Anderson et al. | 455/67.11 |

OTHER PUBLICATIONS

An et al., Directional MAC Protocol for Millimeter Wave based Warless Personal Area Networks, VTC Spring 2008, Delft University of Technology, The Netherlands, May 2008, pp. 1636-1640.

Harada, Hiroshi, Unified and flexible millimeter wave WPAN systems supported by common mode. IEEE 802.15-07-0761-10-003c, National Institute of Information and Communications Technology (NICT), Slides 1-62, Sep. 2007.

(Continued)

*Primary Examiner* — Chi H. Pham
*Assistant Examiner* — Shick Hom
(74) *Attorney, Agent, or Firm* — Kenneth L. Sherman, Esq.; Michael Zarrabian, Esq.; Sherman & Zarrabian LLP (57) ABSTRACT

A system and method for use of a short beacon in a wireless communication network is disclosed. In one embodiment, the method comprises generating a short beacon comprising PHY information, wherein the short beacon excludes MAC information and transmitting the short beacon via the wireless network. In general, three types of short beacons are disclosed, a first type consisting only of a PHY preamble, a second type also including a PHY header, and a third type also including a MAC header. In addition, the scheme of common beacons and individual beacons is described. Common beacons are broadcast omni-directional at the beginning of each superframe with low data rate and individual beacons are unicast to individual devices directionally with high data rate. A common beacon contains information intended for all of the devices of the network. An individual beacon contains information intended for one particular device.

31 Claims, 5 Drawing Sheets

OTHER PUBLICATIONS

IEEE P802.15.3c/D00 Draft Amendment to IEEE Standard for Information Technology—Telecommunications and information exchange between systems—Local and metropolitan area networks—Specific requirements, Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension, IEEE Computer Society, 2008, pp. 1-200.

LG Electronics Inc., WirelessHD Specification Version 1.0 Overview, Oct. 9, 2007, 77 pages.

LAN/MAN Standards Commitee of the IEEE Computer Society, "Standard for Information Technology—Telecommunications and Information Exchange between Systems—Local and Metropolitan Area Networks-Specific Requirements, Part 15.3: Wireless Medium Access Control (MAC) and Physical Layer (PHY) Specifications for High Rate Wireless Personal Area Networks (WPANs), IEEE Std. 802.15.3™- 2003" Sep. 29, 2003, pp. 1-324, IEEE, United States.

U.S. Non-Final Office Action for U.S. Appl. No. 12/189,714 mailed Oct. 4, 2011.

* cited by examiner

SYSTEM AND METHOD FOR USE OF A SHORT BEACON IN A WIRELESS COMMUNICATION NETWORK

CROSS-REFERENCE TO RELATED APPLICATIONS

This application claims the benefit under 35 U.S.C. §119(e) of U.S. Provisional Application No. 61/077,582, filed on Jul. 2, 2008, the disclosure of which is incorporated herein by reference in its entirety.

BACKGROUND

1. Field

This invention relates to wireless communication networks, and in particular, wireless networks in which devices transmit beacons.

2. Description of the Related Technology

A wireless communication network is commonly associated with a communication network where the interconnections among the devices of the network are implemented without the use of wires. Such networks are generally implemented with some type of remote information transmission system that uses electromagnetic waves, such as radio waves, for the carrier.

A wireless personal area network (WPAN) is one type of wireless network used for communication among a plurality of devices, such as computers, mobile phones, personal digital assistants, printers, digital cameras, televisions, media players, etc. Usually, a WPAN covers a short range up to 10 or 20 meters. A number of standards for such short-range network communications have recently been developed, including Bluetooth and IEEE 802.15, for example.

Millimeter wave (mmW) wireless communication in and around the 60 GHz frequency band has the potential to provide a large bandwidth capacity and has thus drawn research interest from both academia and industry. With mmW technology, uncompressed high-definition video/audio can be transmitted wirelessly with similar visual quality to that achieved when using video cables such as High Definition Multimedia Interface (HMDI) cables or Digital Video Interface (DVI) cables. In addition, mmW wireless technology can enable other applications, such as a video kiosk, a fast hard disk or other system back-up, or other applications requiring fast and reliable communication of large amounts of data.

At 60 GHz, there is greater free space loss of power than at 2 or 5 GHz, since such loss can be approximated by a function which quadratically increases with frequency. Nevertheless, this higher free space loss can be at least partially compensated for through the use of directional transmission. A simple directional transmission solution is to use a sectored antenna. By using such an antenna, the transmitter is physically directed towards the receiver. Other technologies, such as beamforming, can use multiple antennas to obtain greater pattern directivity while maintaining small antenna dimensions.

Although directional transmission can improve link quality, it may also introduce new challenges to network control and management, such as control and management of a wireless personal area network. A wireless personal area network (WPAN) system is a computer network used in communication between devices (for example, portable computers, telephones, or personal digital assistants) that are located close to an individual. The devices may or may not belong to that individual. The reach of a WPAN is typically a few meters, but may be more under certain circumstances. A WPAN may be used to communicate between the devices, or to interconnect with a higher level network such as the internet. A number of standards for network communications have recently been developed, including, but not limited to, Bluetooth and IEEE 802.15.

SUMMARY OF CERTAIN INVENTIVE ASPECTS

One aspect of the invention is a method of beacon transmission in a wireless communication network, the method comprising generating a short beacon comprising PHY information, wherein the short beacon excludes MAC information, and transmitting the short beacon via the wireless network.

Another aspect of the invention is a system for beacon transmission in a wireless communication network, the system comprising a beacon generator configured to generate a short beacon comprising PHY information, wherein the beacon excludes MAC information, and a transmitter configured to transmit the short beacon via the wireless network.

Another aspect of the invention is a method of communicating data in a wireless network, the method comprising transmitting an association request to a device, receiving a conventional beacon from the device, communicating data with the device, and receiving a short beacon from the device.

Another aspect of the invention is a system for communicating data in a wireless network, the system comprising a transmitter configured to transmit an association request to a device, and a receiver configured to receive a conventional beacon from the device, wherein the transmitter and receiver are further configured to communicate data with the device, and the receiver is further configured to receive a short beacon from the device.

Another aspect of the invention is a method of communicating data in a wireless network, the method comprising receiving a short beacon comprising PHY information, wherein the short beacon excludes a MAC payload.

Yet another aspect of the invention is a system for communicating data in a wireless network, the system comprising a receiver configured to receive a short beacon comprising PHY information, wherein the short beacon excludes a MAC payload.

Yet another aspect of the invention is a method of communicating data in a wireless network, the method comprising determining a first scheduled time for communication with a first device, determining a direction associated with the first device, generating an individual beacon for the first device, the individual beacon indicative of a second scheduled time for communication with the first device, and transmitting, during the first scheduled time for communication with the first device, the individual beacon in the direction associated with the first device.

Still another aspect of the invention is a system for communicating data in a wireless network, the system comprising a memory configured to store a first scheduled time for communication with a first device and a direction associated with the first device, a beacon generator configured to generate an individual beacon for the first device, the individual beacon indicative of a second scheduled time for communication with the first device, and a transmitter configured to transmit, during the first scheduled time for communication with the first device, the individual beacon in the direction associated with the first device.

DETAILED DESCRIPTION OF CERTAIN INVENTIVE EMBODIMENTS

The following detailed description is directed to certain inventive embodiments. However, the invention can be embodied in a multitude of different ways as defined and covered by the claims. In this description, reference is made to the drawings wherein like parts are designated with like numerals throughout.

Figure 1:
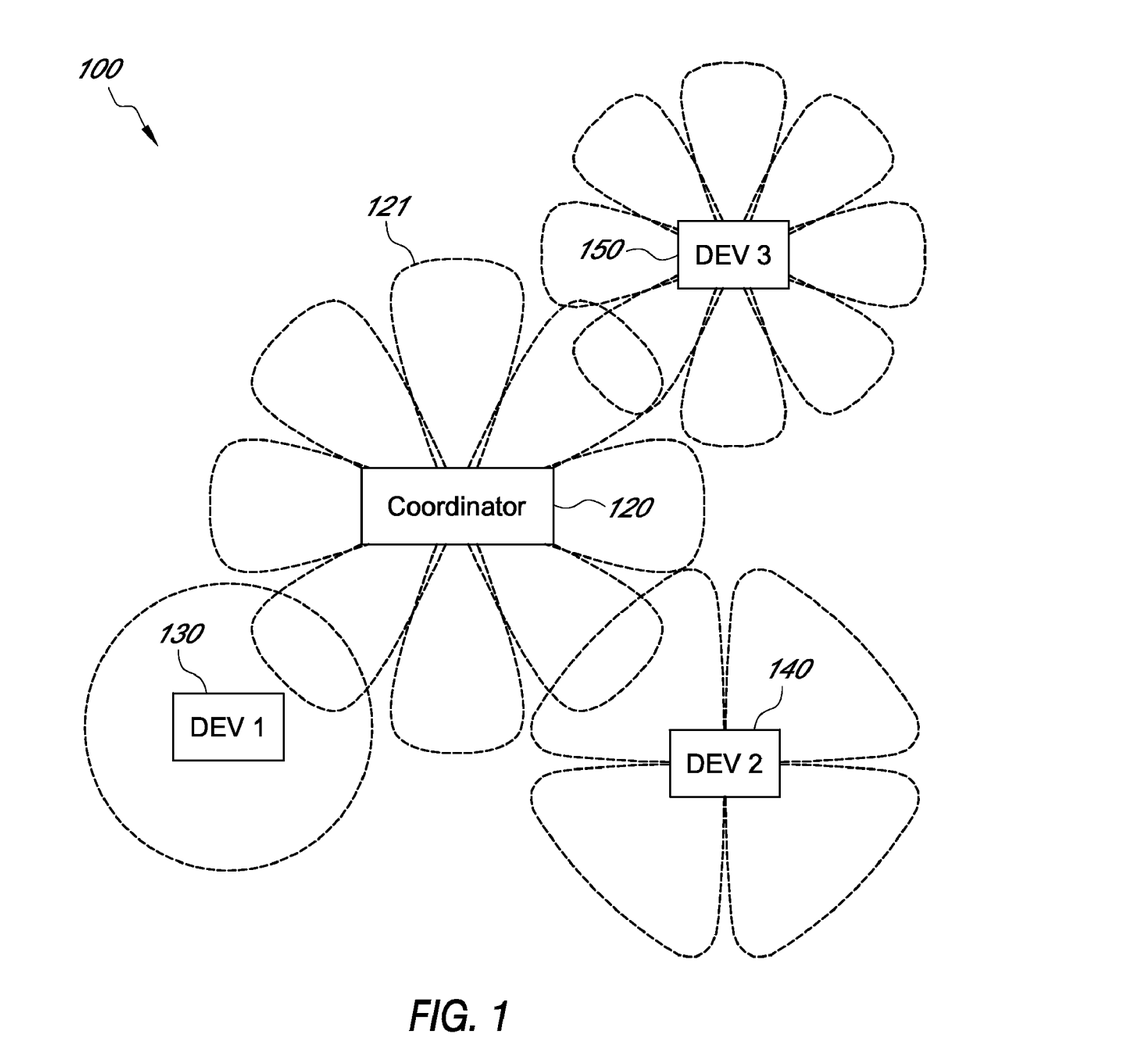
FIG. 1 is a diagram of an exemplary wireless personal area network (WPAN) among devices and their respective antenna beam patterns.

FIG. 1 is a diagram of an exemplary wireless personal area network (WPAN). The illustrated network 100 includes a coordinator 120 a first devices (DEV 1) 130, a second device (DEV 2) 140, and a third device (DEV 3) 150. Other WPAN embodiments may employ ad hoc networking schemes and, thus, lack a designated coordinator. Communication between the various devices in the network may be performed using a variety of different parameters, including different modulation and coding schemes, different protocols, different random access schemes, and different frequency bands.

In some embodiments, the coordinator 120 may be responsible for coordinating data transfer between itself and other devices, or between the other devices of the network. The coordinator 120 may partition a wireless channel into a number of time periods and schedule communication between specific devices during those time periods. The coordinator may be a consumer electronics (CE) component which may be embodied as, for example, a television, a set-top box, a personal computer, a laptop computer, or a dedicated controlling box.

In the network 100 of FIG. 1, the coordinator 120 is configured to perform directional transmission and reception with the devices 130, 140, 150. The coordinator 120 may utilize sector antennas for the directional transmission and/or reception. Each sector 121 represents a different direction along an axis away from the coordinator 120 which can be used for transmission or reception of data. The coordinator 120 selects a sector and, while the sector is selected, is able to transmit and/or receive data in a general direction defined by the shape of the sector.

In the exemplary configuration, the first device 130 may uses omni-directional transmission and reception. The second device 140 uses a sectored antenna with more or fewer sectors than the coordinator 120. Lastly, the third device 150 uses a sector antenna with the same number of sectors as the coordinator 120. Each of the devices 130, 140, 150 can be a consumer electronics (CE) component which may be embodied as, for example, a television, a desktop computer, a laptop computer, a set-top box, a DVD player or recorder, a VCR, an audio player, a digital camera, a camcorder, a game device, or a computer peripheral such as a mouse, a keyboard, a printer, or a scanner.

Directional transmission may also be accomplished through the use of sectored antennas or beamforming by either the coordinator 120 or one or more of the devices 130, 140, 150. In some embodiments, an asymmetric antenna system (AAS) may be employed by either the coordinator or one or more of the devices, resulting in different sets of transmission and reception directions.

Figure 2:
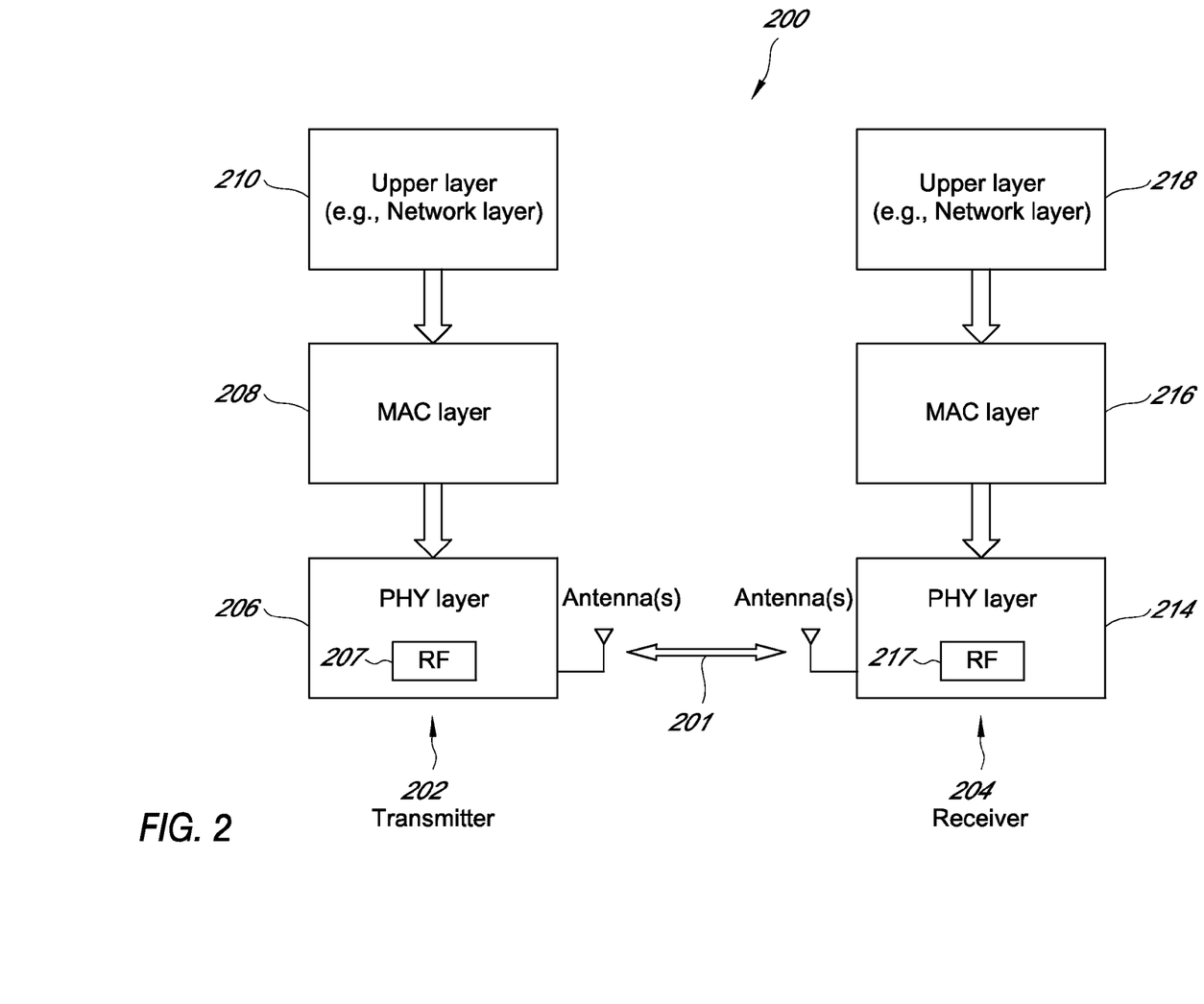
FIG. 2 is a functional block diagram illustrating an exemplary communication system for transmission of data over a wireless medium, according to one embodiment.

FIG. 2 is a generalized block diagram illustrating the network layers in an exemplary wireless personal area network (WPAN) system 200. The WPAN system 200 includes a wireless transmitter 202 and wireless receiver 204. The transmitter 202 includes a physical (PHY) layer 206, a media access control (MAC) layer 208, an upper layer 210, and one or more antennas. Similarly, the receiver 204 includes a PHY layer 214, a MAC layer 216, an upper layer 218, and one or more antennas. In some embodiments, the PHY layers 206, 214 include radio frequency (RF) modules 207, 217. The PHY layers 206, 214 provide wireless communication between the transmitter 202 and the receiver 204 via the RF modules 207, 217 and the one or more antennas through a wireless medium 201.

The upper layers 210, 218 represent one or more layers that are above the MAC layers 208, 216, respectively, and send command and/or data messages to the MAC layers. In certain embodiments (e.g., OSI or TCP/IP models), the upper layer 210, 218 includes a network layer. In certain embodiments, the network layer includes an IP protocol that performs the basic task of getting data packets from source to destination. In other embodiments (e.g., five-layer TCP/IP model), the upper layer 210, 218 further includes a transport layer and an application layer. In other embodiments, (e.g., seven-layer OSI model), the upper layer 210, 218, in addition to the transport layer and the application layer, further includes a session layer and a presentation layer.

In the wireless transmitter 202, the upper layer 210 provides data (e.g., text, graphics, or audio data) and/or command messages to the MAC layer 208. In certain embodiments, the MAC layer 208 can include a packetization module (not shown) which puts the data and/or command messages into the form of one or more data packets. The MAC layer 208 then passes the data packets to the PHY layer 206. The PHY/MAC layers of the transmitter 202 add PHY and MAC headers to the data packets. The PHY layer 206 transmits wireless signals including the data packets to the receiver 204 via the RF module 207 over the wireless channel 201.

In the wireless receiver 204, the PHY layer 214 receives the transmitted wireless signals including the data packets via the RF module 217. The PHY/MAC layers 214, 216 then process the received data packets to extract one or more data/command messages. The extracted data/command messages are passed to the upper layer 210 where the messages are further processed and/or transferred to other modules or devices to be displayed (text or graphics) or played (audio), for example.

Certain functionalities of the transmitter 202 and receiver 204 have been described with respect to FIG. 2. These functionalities can be enabled by a processor and/or memory. The processor can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general purpose processor may be a microprocessor such as an ARM, Pentium®, Pentium II®, Pentium III®, Pentium IV®, Pentium® Pro, an 8051, a MIPS®, a Power PC®, an ALPHA®, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in any suitable computer readable medium or memory. The memory can be a volatile or non-volatile memory such as a DRAM memory, flash memory, ROM memory, EPROM memory, EEPROM memory, registers, hard disk, a removable disk, a CD-ROM, or any other form of suitable storage medium known in the art. An exemplary storage medium is coupled to the processor such the processor can read information from, and write information to, the storage medium. In the alternative, the storage medium may be integral to the processor. The processor and the storage medium may reside in an ASIC or in any suitable commercially available chipset.

Figure 3:
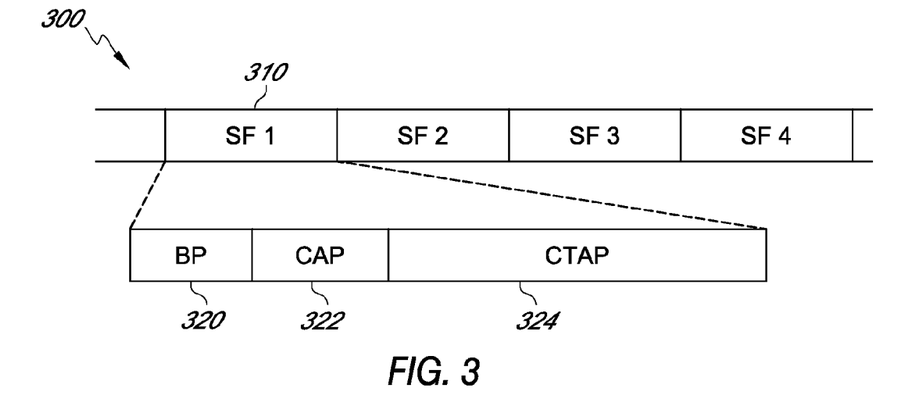
FIG. 3 is a timeline of data transmitted by a device including a plurality of superframes, each labeled (SF), according to one embodiment.

As mentioned above, the coordinator 120 of FIG. 1 may partition a wireless channel into a number of time periods and schedule communication between specific devices during those time periods. FIG. 3 is a diagram of channel time partitioned into a plurality of superframes (SFs) 310 within the WPAN, according to one embodiment. Each of the superframes 310 may be further partitioned into a beacon period (BP) 320, a contention access period (CAP) 322, and a channel time access period (CTAP) 324. A skilled technologist will appreciate that the superframe may include other suitable periods, such as guard time periods, depending on the design of the network.

During the beacon period 320, the coordinator, such as the coordinator 120 of FIG. 1, transmits beacons to wireless devices, such as the devices 130, 140, 150 of FIG. 1. A beacon is an electromagnetic waveform from which the devices can retrieve information about the network. The beacon may, for example, contain information about the coordinator or the superframe partitioning. A beacon may also contain data indicative of reservation schedule information for devices in the network, e.g., when a particular device should transmit data to the coordinator or vice versa. Beacons may be transmitted omni-directionally or in one or more particular directions. Beacons may be transmitted using any of a number of modulation and coding schemes, and any number of physical layer transmission schemes, including orthogonal frequency division multiplexing (OFDM) and single-carrier transmission. Beacons may be broadcast, such that any device may receive and interpret the beacon, or they may be addressed to a particular device or group of devices. Beacons transmitted within the beacon period 320 are not necessarily the same size, and thus do not necessarily take the same amount of time to transmit. The beacon period 320 may be partitioned into sub-beacon periods, where a beacon is transmitted in one direction by the coordinator during each sub-beacon period.

The wireless channel may be a random access channel during the CAP 322. Any of a number of random access schemes may be used in the network, including, but not limited to, slotted Aloha, carrier sense multiple access (CSMA), carrier sense multiple access with collision avoidance (CSMA/CA), or preamble sense multiple access (PSMA). As is the case in many random access schemes, collisions may occur when a number of devices transmit data packets simultaneously.

During the CAP 322, the wireless devices announce themselves to the coordinator by transmitting an association request to the coordinator. In response to the association request, the coordinator may reserve time during the CTAP 324 of subsequent superframes for communication with the device and may transmit information indicative of the reservation to the device during the beacon period 320.

Although, association messages are typically transmitted during the CAP 322 of a superframe 310, other messages, including MAC commands, may be included in a packet and transmitted during this time. For example, devices may transmit data to one another, thereby bypassing the coordinator during the CAP 322. Also, other data packets besides association messages may be transmitted from the devices to the coordinator during the CAP 322.

As mentioned above, the CTAP 324 is the time partition reserved for communication between specific devices of the network. During reserved channel time, two devices, such as the coordinator and another device, may efficiently transmit large amounts of data, such as audio or video data. Other non-data functions may also be performed during the reserved time, such as beamforming training or tracking procedures.

As described above, in some network embodiments, beacons are broadcast from a coordinator to all devices periodically. Beacons are used for many purposes, including, dividing the channel time into superframes for synchronization and communication to the various network devices channel time scheduling and other network configuration information. In certain wireless networks, such as those operating at 60 GHz, beacons are often transmitted at a much lower data rate than the data traffic. For example, in networks operating according to the WirelessHD standard, beacons are transmitted at 2.5 Mbps or 10 Mbps. However, data traffic can be transmitted at rates up to several Gbps. Beacon transmission thus introduces a large overhead to MAC data transmission and reduces efficiency.

Beacons may particularly introduce undesirable amounts of overhead if a great number of information elements (IEs) are included in its payload portion. For example, a 400 octet beacon payload may take 640 μs if the data rate is 5 Mbps. In a 60 GHz WPAN with ad-hoc mode, such as that specified by ECMA TC48, the problem of beacon overhead is more severe because multiple devices can send out beacons periodically.

In addition, to support the coexistence and interoperability of devices with different types of waveforms operating in the same frequency band, one device, such as the coordinator 120 of FIG. 1, may need to send multiple types of beacons regularly on the same channel. For example, a multi-mode coordinator (MMC) specified by IEEE 802.15.3c may send out one single carrier (SC) beacon and two different orthogonal frequency-division multiplexing (OFDM) beams at each superframe. Moreover, many wireless standardization bodies such as the WirelessHD consortium, IEEE 802.15.3c task group, and ECMA TC48 are producing different WPAN standards on the same frequency band. To enable interoperability between different standards, some devices also need to support different waveform types of beacons. This may further increase the amount of beacon overhead. It is desirable to find solutions which increase this efficiency or reduce this overhead. One method is to reduce the beacon size.

Several different short beacon schemes are disclosed herein. Each beacon scheme may find use in one of more different stages of communication between devices. In general, a beacon comprises a PHY preamble, a PHY header, a MAC header, and a MAC payload. Three particular types of short beacon are described in detail below, including Type 1 beacons, which consist of a portion of the PHY preamble; Type 2 beacons, which consist of the whole PHY preamble plus PHY header information; and Type 3 beacons, which consist of the PHY preamble information, PHY header information, and MAC header information.

Figure 4:
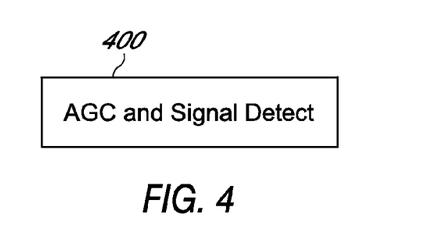
FIG. 4 is a diagram of a Type 1 short beacon transmitted by a device, according to one embodiment.

Type 1 short beacons only have part of the PHY preamble, which lets other devices know the waveform type of the beacon sender. FIG. 4 is a diagram of a Type 1 short beacon 400, according to one embodiment. The beacon 400 illustrated in FIG. 4 includes only automatic gain control (AGC) and signal detect information. In other embodiments, automatic gain control information is absent. In other embodiments, a separate and distinct signal detect portion is absent. In other embodiments, other PHY preamble information can be included. As the purpose of this type of beacon is simply to transmit a type of waveform, the exact composition of the data embedded in the waveform is of secondary consequence. The beacon can be composed of a pseudorandom bit sequence, modulated onto a particular waveform, e.g. an OFDM or a single-carrier BPSK or QAM waveform.

This type of beacon can be used by the beacon sender when no other devices with the same waveform have joined the WPAN. The beacon sender can regularly transmit this type a short beacon to announce the existence of its supported waveform. When a device detects a Type I short beacon during a channel scanning stage, it can request the beacon sender to transmit longer beacons with more information.

Figure 5:
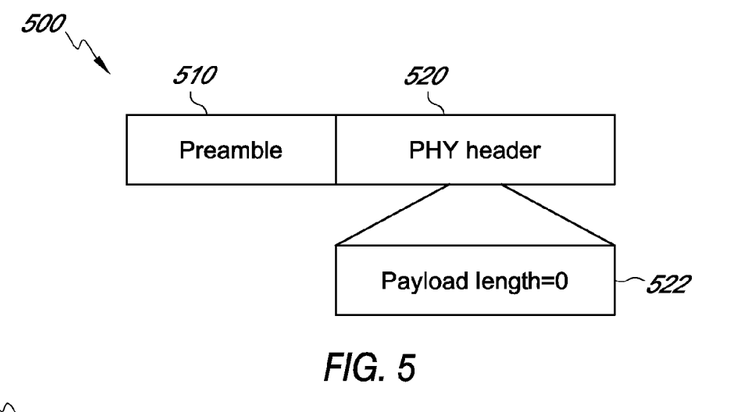
FIG. 5 is a diagram of a Type 2 short beacon transmitted by a device, according to one embodiment.

Type 2 short beacons have the PHY preamble information plus the PHY header information. FIG. 5 is a diagram of a Type 2 short beacon 500, according to one embodiment. As shown in FIG. 5, the beacon 500 includes a PHY preamble 510 and a PHY header 520, in which the payload length 522 is set to zero to indicate that there is no MAC header or MAC payload information included in the beacon. The PHY preamble can include all of the standard PHY preamble information, or only a portion of it. The PHY header may similarly be abridged.

This type of beacon can be used when there is no PHY payload information change at the PHY layer. Devices receiving the beacon 500 can indirectly deduce some additional information from an analysis of the beacon signal strength, direction, and/or receiving time. Since beacons are transmitted periodically, a device receiving one or more beacons can deduce when the next beacon will be received. Deduced information can include the transmitter's MAC address.

Figure 6:
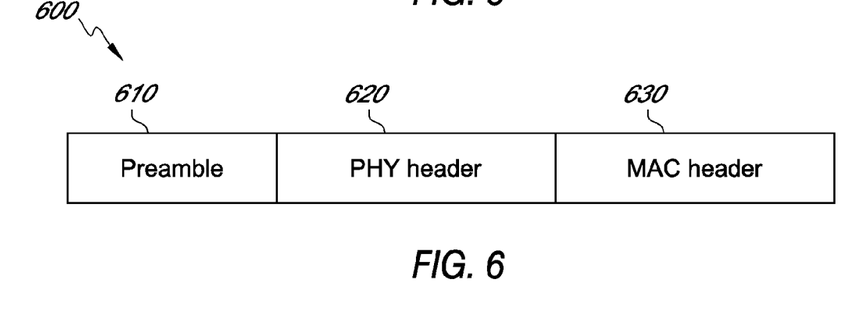
FIG. 6 is a diagram of a Type 3 short beacon transmitted by a device, according to one embodiment.

Another type of short beacon, referred to herein as a Type 3 beacon, is a short beacon with a PHY preamble, a PHY header, and a MAC header, but no MAC payload. FIG. 6 is a diagram of a Type 3 short beacon 600, according to one embodiment. The beacon 600 includes some, if not all, the PHY preamble information 610, PHY header information 620, and MAC header information 630. This type of beacon can be used when there is no change in the MAC payload information between beacon transmissions.

In almost all wireless standards, such as the 802.11 and 802.15 series, the beacon is a MAC concept which includes a PHY preamble, a PHY header, a MAC header, and a MAC payload. In this disclosure, three types of beacons are discussed: Type 1, having a modified or unmodified PHY preamble, and lacking a PHY header, MAC header, and MAC payload; Type 2, having a PHY preamble and a PHY header, but lacking a MAC header and MAC payload; and Type 3, having a PHY preamble, a PHY header, and a MACH header, but lacking a MAC payload. Each of the short bacon types can be used for waveform announcement and superframe alignment. By reducing the beacon size, channel time overhead caused by beacons is reduced, as is beacon processing time. The reduction in beacon processing time also saves power at the device receiving the beacons.

The skilled technologist will recognize that short beacons of other types are possible, including beacons having any one or more, but not all of a PHY preamble, a PHY header, a MAC header, and a MAC payload.

Although uses for each of the beacons have been disclosed above, other uses in the context of an operating network will now be discussed. A first device, such as the coordinator 120 of FIG. 1, transmits a Type 1 short beacon having a particular waveform to announce that the first device can support that waveform. If a device can support multiple types of waveforms, the device can send out multiple Type 1 short beacons with corresponding waveforms.

Figure 7:
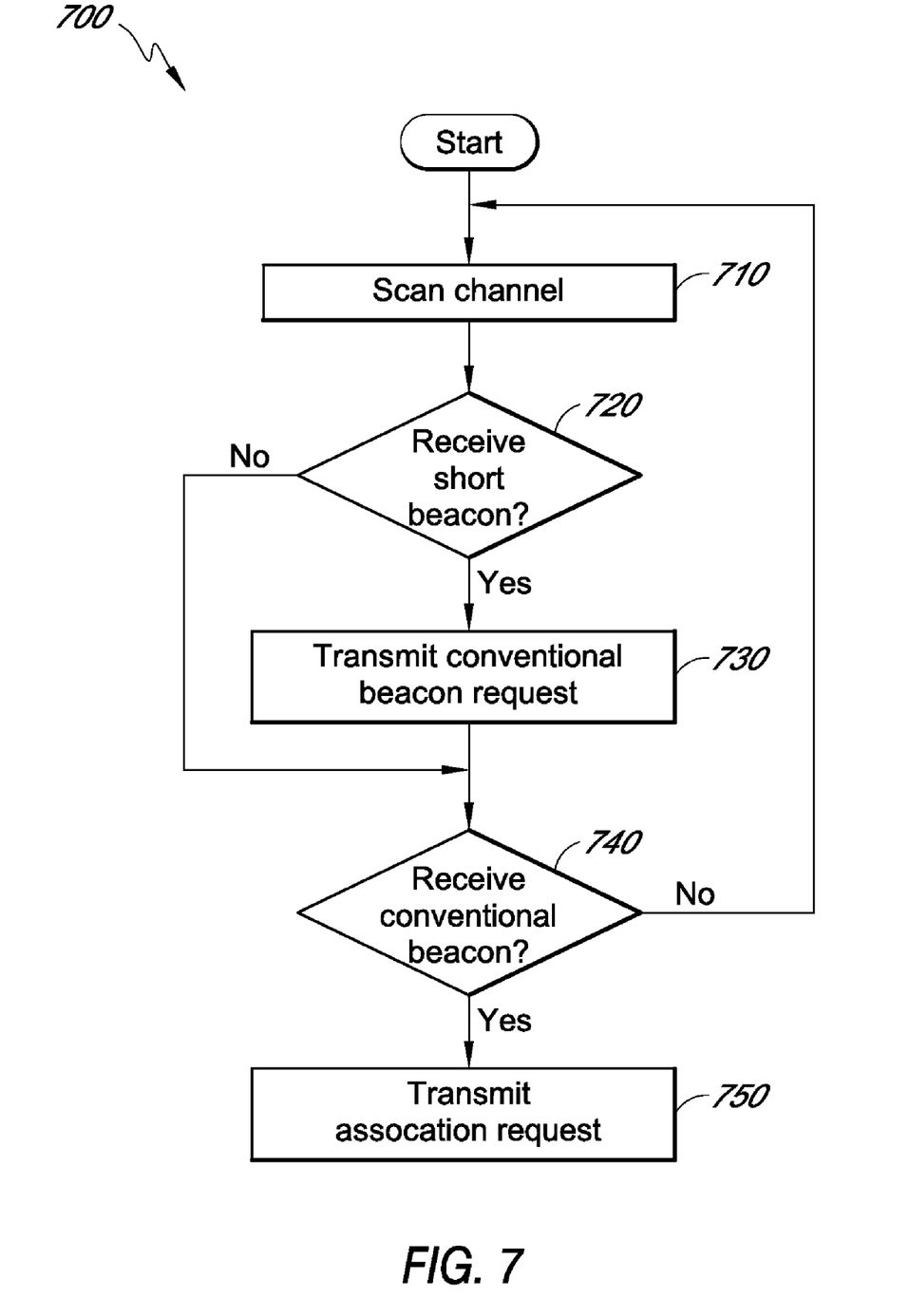
FIG. 7 is a flowchart illustrating a method of associating devices in the WPAN.

When a second device, such as the second device 140 of FIG. 1, turns on, it can scan all channels searching for short or conventional beacons. FIG. 7 is a flowchart illustrating a method 700 of associating a first device with a second device. Once the second device turns on, the method 700 begins, in block 710, with a channel scan. The second device listens on each channel, or in each direction, for beacons from the first device. If a short beacon is received, in block 720, the second device transmits a conventional beacon request, as shown in block 730, in response to which the first device can transmit a conventional beacon. The conventional beacon request may cause the first device to send a conventional beacon addressed to the second device, or simply to switch the next beacon transmitted to a conventional beacon. If a short beacon is not received, in block 720, the process moves to block 740, where it is determined if a conventional beacon is received. Similarly, after transmitting a conventional beacon request in block 730, the process moves to block 740. If a conventional beacon is received, the second device transmits an association request, in block 750, and communications move to the association stage. If a conventional beacon is not received, in block 740, the process returns to block 710 and channel scanning continues.

During the channel bandwidth reservation stage a conventional beacon can be used. However, the overhead of beacon transmission can be reduced by the common/individual beacon approach described below. After association, and the formation of a data connection, a conventional beacon can be used, with the common/individual beacon approach further reducing overhead. Alternatively, Type 2 or Type 3 beacons could be used if the MAC information is unchanging between superframes.

When conventional beacons are used instead of short beacons, such as during the channel bandwidth reservation stage or after association, the problem of beacon overhead still exists. Beacon overhead can further be reduced by taking advantage of high-rate directional transmission.

The information typically transmitted in a beacon can be divided into two categories: (1) information for all devices, such as network ID; and (2) information for individual devices, such as channel time allocation (CTA) information for a device. In one embodiment of a common/individual beacon scheme, common beacons carry the information commonly used for all devices, particularly for those devices which haven't associated or haven't reserved channel time. A common beacon can be omni-directionally broadcast with a low data rate. Omni-directional broadcast can also be emulated by transmitting the common beacon in each direction subsequently. An individual beacon is transmitted directionally with a high date rate at the starting point of the reserved period for a particular device during each superframe. The individual beacon carries information used for only that device. For example, traditionally, all CTA or scheduling information for all devices is carried in the common beacon. In one embodiment, the CTA or scheduling information is distributed to different individual beacons with high rate directional transmission. The information in the common or individual beacon relates to a subsequent superframe, e.g. the next superframe, rather than the current superframe, in order to compensate for a possibly long beacon processing time at the MAC layer.

If all associated devices have successfully reserved CTAs to communicate with the coordinator with high-rate directional transmission, the common beacon sent out by the coordinator can be switched to a short beacon. If only some of the associated devices reserved CTAs for communication between each other (direct link) instead of communicating with the coordinator, a Type 3 short beacon can be used.

Figure 8:
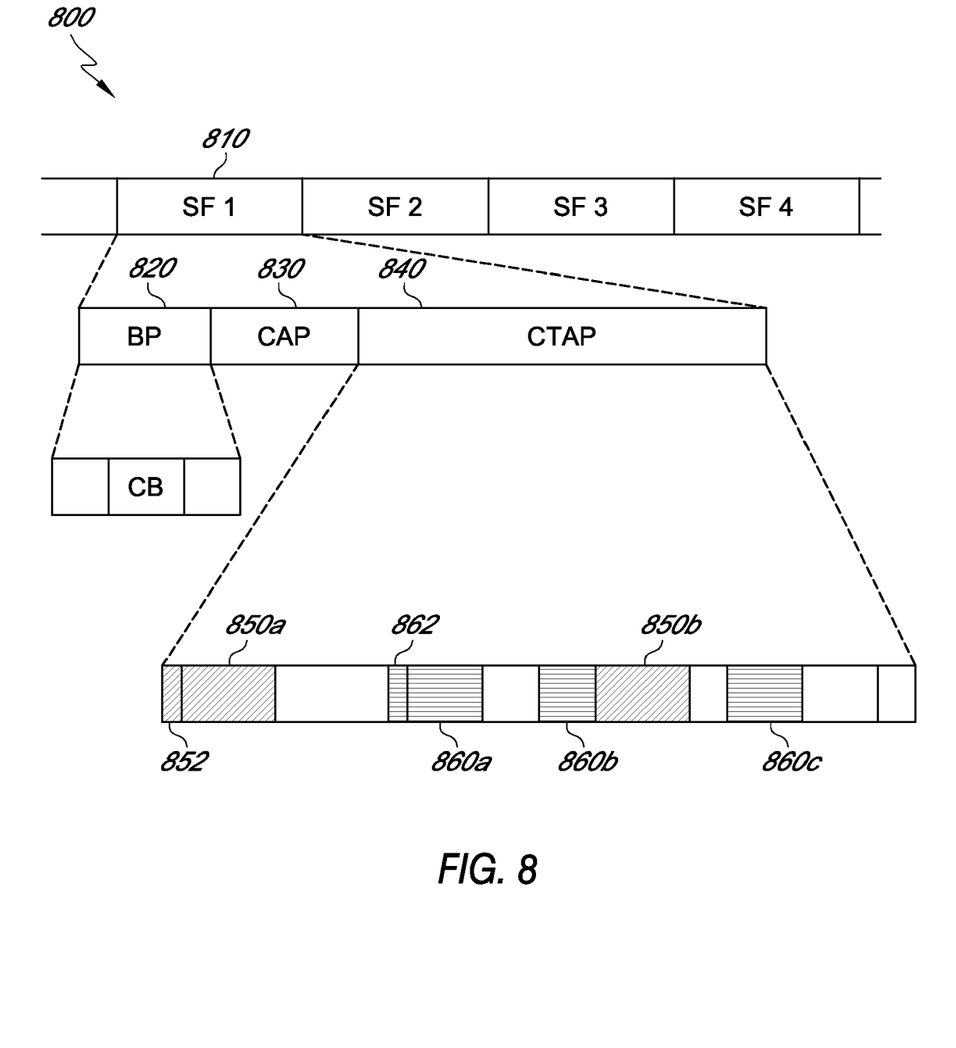
FIG. 8 is a timeline of data transmitted by a device including common beacons and individual beacons.

FIG. 8 is a diagram of channel time partitioned into a plurality of superframes (SFs) 810 within the WPAN, according to one embodiment. As described above with respect to FIG. 3, each of the superframes 810 may be further partitioned into a beacon period (BP) 820, a contention access period (CAP) 830, and a channel time access period (CTAP) 840. A skilled technologist will appreciate that the superframe may include other suitable periods, such as guard time periods, depending on the design of the network.

During the BP 820, the coordinator transmits a common beacon 825 containing information intended for all of the devices of the network. In one embodiment, the common beacon 825 is transmitted omni-directionally. In another embodiment, the common beacon 825 is transmitted in a number of directions subsequently during the BP 820 to emulate omni-directional transmission. During the CTAP 840, the coordinator transmits individual beacons to specific devices during the time previously scheduled for communication between the coordinator and the specific device. In the illustrated embodiment, the coordinator and a first device are scheduled to communicate during a first time 850a and a second time interval 850b. Likewise, the coordinator and a second device are scheduled to communicate during a third time interval 860a, a fourth time interval 860b, and a fifth time interval 860c.

During the first time interval 850a or the second time interval 850b, the coordinator transmits an individual beacon 852 to the first device. Similarly, during one of the time intervals scheduled for communication between the coordinator and the second device, i.e. 860a, 860b, 860c, the coordinator transmits for the second device 862 to the second device. In some embodiments, including the illustrated embodiment, the coordinator transmits the individual beacon 852, 862 at the beginning of the scheduled time. In other embodiments, however, the individual beacons 852, 862 are not transmitted at the beginning of the scheduled time. As the individual beacons 852, 862 can contain scheduling information for a subsequent SF, they may be transmitted at any scheduled time prior to the subsequent SF.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of beacon transmission in a wireless communication network, the method comprising:
   generating a short beacon comprising PHY information, wherein the short beacon excludes MAC information;
   transmitting the short beacon via the wireless network;
   transmitting a conventional beacon request in response to the short beacon; and
   transmitting a conventional beacon in response to the conventional beacon request.

2. The method of claim 1, wherein the short beacon comprises a PHY preamble, and wherein the short beacons excludes a PHY header, a MAC header, or a MAC payload.

3. The method of claim 1, wherein the short beacon consists of PHY preamble information.

4. The method of claim 1, wherein the conventional beacon has a data size which is larger than a data size of the short beacon.

5. The method of claim 1, wherein the conventional beacon comprises a PHY preamble, a PHY header, a MAC header, and a MAC payload.

6. The method of claim 1, wherein the short beacon comprises a first PHY preamble, the conventional beacon comprises a second PHY preamble, and the first PHY preamble has a data size which is smaller than a data size of than the second PHY preamble.

7. The method of claim 1, wherein the short beacon is a common beacon, further comprising:
   determining a first scheduled time for communication with a first device;
   determining a direction associated with the first device;
   generating an individual beacon for the first device, the individual beacon indicative of a second scheduled time for communication with the first device; and
   transmitting, during the first scheduled time for communication with the first device, the individual beacon in the direction associated with the first device.

8. The method of claim 7, further comprising:
   determining a first scheduled time for communication with a second device;
   determining a direction associated with the second device;
   generating an individual beacon for the second device, the individual beacon indicative of a second scheduled time for communication with the second device; and
   transmitting, during the first scheduled time for communication with the second device, the individual beacon in the direction associated with the second device.

9. The method of claim 7, further comprising: transmitting, the common beacon prior to transmitting the individual beacon for the first device.

10. The method of claim 7, wherein the common beacon is transmitted omni-directionally.

11. The method of claim 7, wherein the individual beacon comprises a PHY preamble, a PHY header, a MAC header, and a MAC payload.

12. A system for beacon transmission in a wireless communication network, the system comprising:
   a beacon generator configured to generate a short beacon comprising PHY information and to generate a conventional beacon, wherein the short beacon excludes MAC information; and
   a transmitter configured for transmitting the short beacon via the wireless network, transmitting a conventional beacon request in response to the short beacon, and transmitting a conventional beacon via the wireless network in response to the conventional beacon request.

13. The system of claim 12, wherein the system is a consumer electronics component.

14. The system of claim 13, wherein the consumer electronics component comprises a television, a set-top box, a personal computer, a laptop computer, or a dedicated controlling box.

15. The system of claim 12, wherein the short beacon is a common beacon, further comprising:
a memory configured to store a first scheduled time for communication with a first device and a direction associated with the first device, wherein the beacon generator is further configured to generate an individual beacon for the first device, the individual beacon indicative of a second scheduled time for communication with the first device, and wherein the transmitter is further configured to transmit, during the first scheduled time for communication with the first device, the individual beacon in the direction associated with the first device.

16. A method of communicating data in a wireless network, the method comprising:
transmitting an association request to a device;
receiving a conventional beacon from the device;
communicating data with the device; and
receiving a short beacon from the device, wherein the short beacon comprises a first PHY preamble, the conventional beacon comprises a second PHY preamble, and the first PHY preamble has a data size which is smaller than a data size of the second PHY preamble.

17. The method of claim 16, wherein the conventional beacon has a data size which is larger than a data size of the short beacon.

18. The method of claim 16, wherein the short beacon further comprises a PHY header, but does not comprise a MAC header or a MAC payload, and wherein the conventional beacon further comprises a PHY header, a MAC header, and a MAC payload.

19. The method of claim 16, wherein the short beacon further comprises a PHY header, and a MAC header, but does not comprise a MAC payload, and wherein the conventional beacon further comprises a PHY header, a MAC header, and a MAC payload.

20. A system for communicating data in a wireless network, the system comprising:
a transmitter configured to transmit an association request to a device; and
a receiver configured to receive a conventional beacon from the device, wherein the transmitter and receiver are further configured to communicate data with the device, and the receiver is further configured to receive a short beacon from the device, wherein the short beacon comprises a first PHY preamble, the conventional beacon comprises a second PHY preamble, and the first PHY preamble has a data size which is smaller than a data size of the second PHY preamble.

21. The system of claim 20, wherein the data is indicative of audiovisual content.

22. The system of claim 20, wherein the system is a consumer electronics component.

23. The system of claim 22, wherein the consumer electronics component comprises a television, a desktop computer, a laptop computer, a set-top box, a DVD player or recorder, a VCR, an audio player, a digital camera, a camcorder, a game device, or a computer peripheral such as a mouse, a keyboard, a printer, or a scanner.

24. A method of communicating data in a wireless network, the method comprising:
receiving a short beacon comprising PHY information, wherein the short beacon excludes a MAC payload; and
receiving a conventional beacon,
wherein the short beacon comprises a first PHY preamble, the conventional beacon comprises a second PHY preamble, and the first PHY preamble has a data size which is smaller than a data size of the second PHY preamble.

25. The method of claim 24, wherein the short beacon further excludes a MAC header.

26. The method of claim 25, further comprising determining MAC information from the short beacon.

27. A system for communicating data in a wireless network, the system comprising a receiver configured to receive a short beacon comprising PHY information, and to receive a conventional beacon, wherein the short beacon comprises a first PHY preamble and excludes a MAC payload, and the conventional beacon comprises a second PHY preamble, and the first PHY preamble has a data size which is smaller than a data size of the second PHY preamble.

28. The system of claim 27, wherein the short beacon further excludes a MAC header.

29. The system of claim 28, further comprising a processor configured to determine MAC information from the short beacon.

30. The method of claim 1, wherein the short beacon provides a particular waveform announcement.

31. The method of claim 30, wherein the particular waveform announcement represents that a device that transmits the short beacon supports the particular waveform.

* * * * *